US005871651A

United States Patent [19]

McSpadden

[11] Patent Number: 5,871,651

[45] Date of Patent: Feb. 16, 1999

[54] ELECTRONIC FILTER STATUS SENSOR

[75] Inventor: John S. McSpadden, Greensboro, N.C.

[73] Assignee: Gilbarco Inc., Greensboro, N.C.

[21] Appl. No.: 832,566

[22] Filed: Apr. 2, 1997

[51] Int. Cl.[6] ........ B01D 35/143

[52] U.S. Cl. ........ 210/739; 210/87; 210/93; 222/36; 222/40; 222/189.06

[58] Field of Search ........ 210/87, 88, 89, 210/93, 94, 138, 143, 739; 222/23, 26–28, 36, 54, 189.06, 40; 364/479.01, 479.11, 479.14, 509, 510; 137/234.6

[56] References Cited

U.S. PATENT DOCUMENTS

| | | | |
|---|---|---|---|
| 3,169,667 | 2/1965 | Headrick | 222/189.06 |
| 4,876,653 | 10/1989 | McSpadden et al. | 222/26 |
| 4,930,665 | 6/1990 | Devine | 222/28 |
| 5,049,263 | 9/1991 | Hoffman et al. | 210/86 |
| 5,062,950 | 11/1991 | Shieh | 210/86 |
| 5,246,571 | 9/1993 | Woltmann | 210/86 |
| 5,304,300 | 4/1994 | Parsons | 210/86 |
| 5,315,838 | 5/1994 | Thompson . | |
| 5,361,216 | 11/1994 | Warn et al. | 364/510 |
| 5,382,355 | 1/1995 | Arlozynski | 210/85 |
| 5,395,515 | 3/1995 | Ford | 210/86 |
| 5,484,536 | 1/1996 | Yamaguchi et al. | 210/741 |
| 5,525,241 | 6/1996 | Clavin et al. | 210/143 |
| 5,557,085 | 9/1996 | Myers et al. | 222/26 |
| 5,602,745 | 2/1997 | Atchley et al. | 222/36 |
| 5,695,092 | 12/1997 | Schrandt | 222/36 |

FOREIGN PATENT DOCUMENTS

| | | | |
|---|---|---|---|
| 0 295 335 | 12/1987 | European Pat. Off. . | |
| 42 30 825 A 1 | 3/1993 | Germany . | |
| 195 04 328 A1 | 8/1996 | Germany . | |
| 64-84899 | 3/1989 | Japan | 210/87 |
| 3-127680 | 5/1991 | Japan | 210/87 |
| 392 304 | 3/1963 | Switzerland . | |
| WO 96/24426 | 8/1996 | WIPO . | |

OTHER PUBLICATIONS

PCT International Search Report for PCT/GB 98/00981, undated.

*Primary Examiner*—Joseph W. Drodge
*Attorney, Agent, or Firm*—Rhodes Coats & Bennett, L.L.P.

[57] ABSTRACT

A fuel dispenser having a filter status sensor includes a fuel delivery path for delivering fuel from a station storage tank to a vehicle; a fuel filter in the delivery path for filtering fuel flowing in the delivery path; a flow monitor in the delivery path for measuring fuel flow in the delivery path; and a controller associated with the flow monitor adapted to determine and compare a first flow rate taken during a first cycle with a second flow rate taken during a second cycle. The controller provides a filter status signal when the first and second flow rates differ by more than a predetermined difference indicative of an unclean fuel filter.

49 Claims, 6 Drawing Sheets

ELECTRONIC FILTER STATUS SENSOR

BACKGROUND OF THE INVENTION

The present invention relates to fuel dispensers and fuel dispensing systems and, more particularly, to a fuel filter status sensor for detecting a clogged filter in a fuel delivery path of a fuel dispenser or dispensing system. Gasoline dispensers use filters in the fuel delivery path to protect dispensers against harm from particles in the fuel and give customers a cleaner product. As fuel flows through the filter, particles in the fuel are continuously caught by the filter. Maximum obtainable delivery rates become reduced as the filter is loaded with entrapped debris resulting in a filter that is "unclean". Due to the many different conditions and environments found in the fuel dispensing industry, it has been impossible to set an absolute standard, based on time or number of gallons, at which to change the filter. Thus, there is a need in the fuel dispensing industry for a system capable of determining when a fuel filter needs to be changed which is not based on a fixed number of gallons delivered or a set amount of time.

SUMMARY

The present invention fulfills this need by providing a system for determining filter status by monitoring maximum flow rates over sequential cycles which are based on time, an amount of fuel delivered or a number of transactions. In addition, this system provides a way to determine maximum flow rates during sequential cycles extending over multiple, individual fueling operations in which delivery rates may be constantly varied by the individual operating the dispenser and the dispenser itself throughout each operation.

Preferably, the system is integrated in a fuel dispenser and includes a control system adapted to constantly determine the flow rate throughout a series of fueling operations by measuring the number of pulses from a flow meter occurring during a set period of time or measuring the amount of time occurring between pulses. When determining flow rate based on the number of pulses received during a set period ot time, the set period of time is typically 250 ms. After each time period elapses, the controller determines the flow rate, and compares the current flow rate with a maximum flow rate value stored in a first memory location. If the current flow rate is higher than the maximum flow rate stored in memory, the controller will replace the stored flow rate with the new flow rate value. If the new flow rate value is lower than the one stored in memory, the one previously stored value will remain.

The controller will repeat this process during a number of fueling operations until a predetermined number of gallons of fuel has been delivered through the fuel delivery path (or a preset amount of time has elapsed). Preferably, the predetermined number of gallons is set to 10,000 gallons; however, this number is programmable and may vary depending on the application and environment. Once the predetermined number of gallons is delivered, the maximum flow rate value during the first cycle is stored for comparison with a maximum flow rate value to be determined in one or more subsequent cycles to determine if the maximum fuel delivery rate is being negatively affected by an unclean filter.

After the first cycle, a new flow rate measurement cycle begins until another predetermined number of gallons has been delivered through the delivery path (or a preset amount of time has elapsed). Preferably, the second delivery cycle is less than the number of gallons defining the first cycle. The second cycle may be defined as 5,000 gallons. The control system determines and compares the current flow rates with a maximum flow rate value stored in a second memory location and updates the stored value when the current flow rate exceeds the maximum flow rate value stored in the second memory location. After the second cycle is complete, the resulting maximum flow rate value stored for the second cycle is compared with the first maximum flow rate value stored during the first cycle. If the second maximum flow rate value is lower than the first maximum flow rate value by a predetermined amount, typically two gallons per minute, the controller will provide a filter status signal to the dispenser, the dispenser's display, a site controller or a remote location, as desired. The signal may ultimately provide an audible and/or visual indicator of filter status.

If the second maximum flow rate value from the second cycle is not lower than the first maximum flow rate value of the first cycle by the predetermined amount, a third cycle begins in similar fashion to the second cycle. Upon completion, the third maximum flow rate value obtained during the third cycle is compared with the first maximum flow rate value obtained during the first cycle. Tile process will continue until a maximum flow rate value for a subsequent cycle is obtained which is less than the first maximum flow rate value by the predetermined amount. Once this occurs, the filter status signal is activated. Upon this alert, an operator may change the filter. The maximum flow rate values stored in the various memory locations are reset wherein the entire cycle begins anew. Typically, the system operator will reset the controller when the filter is changed.

Accordingly, one aspect of the current invention is to provide a fuel dispenser having a filter status sensor including a fuel delivery path for delivering fuel from a station storage tank to a vehicle; a fuel filter in the delivery path for filtering fuel flowing in the delivery path; a flow monitor in the delivery path for measuring fuel flow in the delivery path; and a controller associated with the flow monitor adapted to determine and compare a first flow rate taken during a first cycle with a second flow rate taken during a second cycle. The controller provides a filter status signal when the first and second flow rates differ by more than a predetermined difference indicative of an unclean fuel filter.

Another aspect of the current invention is to provide a fuel dispenser computer for use in a fuel dispenser having a fuel delivery path, a filter along the delivery path and a flow monitor providing a flow signal representative of a quantity of fuel flow to the computer. The computer includes a controller and memory associated with the controller adapted to provide a series of functions. First, the controller receives the flow signal representative of a quantity of fuel delivered during a plurality of fueling operations and continuously determines substantially current flow rates based on the quantity of fuel flow per unit of time. Next, the computer compares the current flow rate with a first maximum flow rate value stored in a first memory location during a first cycle and stores the current flow rate in the first memory location if the current flow rate is greater than the first maximum flow rate value stored in the first memory location during a first cycle. The controller then compares the current flow rate with a second maximum flow rate value stored in a second memory location during a second cycle and stores the current flow rate in the second memory location if the current flow rate is greater than the second maximum flow rate value stored in the second memory location during the second cycle. Finally, the controller compares the first maximum flow rate value and the second maximum flow rate value after the first and second cycle and provides a filter status signal if the first and second maximum flow rates differ by more than a predetermined difference indicative of an unclean fuel filter.

The cycles may be defined by a predefined amount of fuel, a number of transactions or a set cycle of time. When the cycles are defined by a predefined amount of fuel, it is preferable to define the first cycle as being about 10,000 gallons and the second cycle as being about 5,000 gallons. The unit of time for determining the current flow rates is preferably two hundred and fifty (250) milliseconds (ms). The maximum flow rate values stored in the various memory locations are preferably initially set to zero at the beginning of the first cycle.

If the computer determines that the maximum flow rate during the second cycle is not less than the maximum flow rate during the first cycle, a third cycle begins analogous to the first and second cycles. The controller compares the current flow rate with a third maximum flow rate value stored in a third memory location during the third cycle; stores the current flow rates in the third memory location if the current flow rates are greater than the third maximum flow rate value stored in the memory location during the third cycle; compares the maximum flow rate value and the third maximum flow rate value after the third cycle; and provides a filter status signal if the first and third maximum flow rate values differ by more than the predetermined difference. Notably, the various memory locations wherein the maximum flow rate values are stored may be shared or adjusted as desired by the programmer. For example, the third maximum flow rate value may be stored in the memory location where in the second maximum flow values were stored. Furthermore, the maximum flow rate values determined for each cycle may be stored in separate memory locations such that during subsequent cycles the maximum flow rate values are stored in the same memory location or register.

DESCRIPTION OF THE PREFERRED EMBODIMENT

Figure 1:
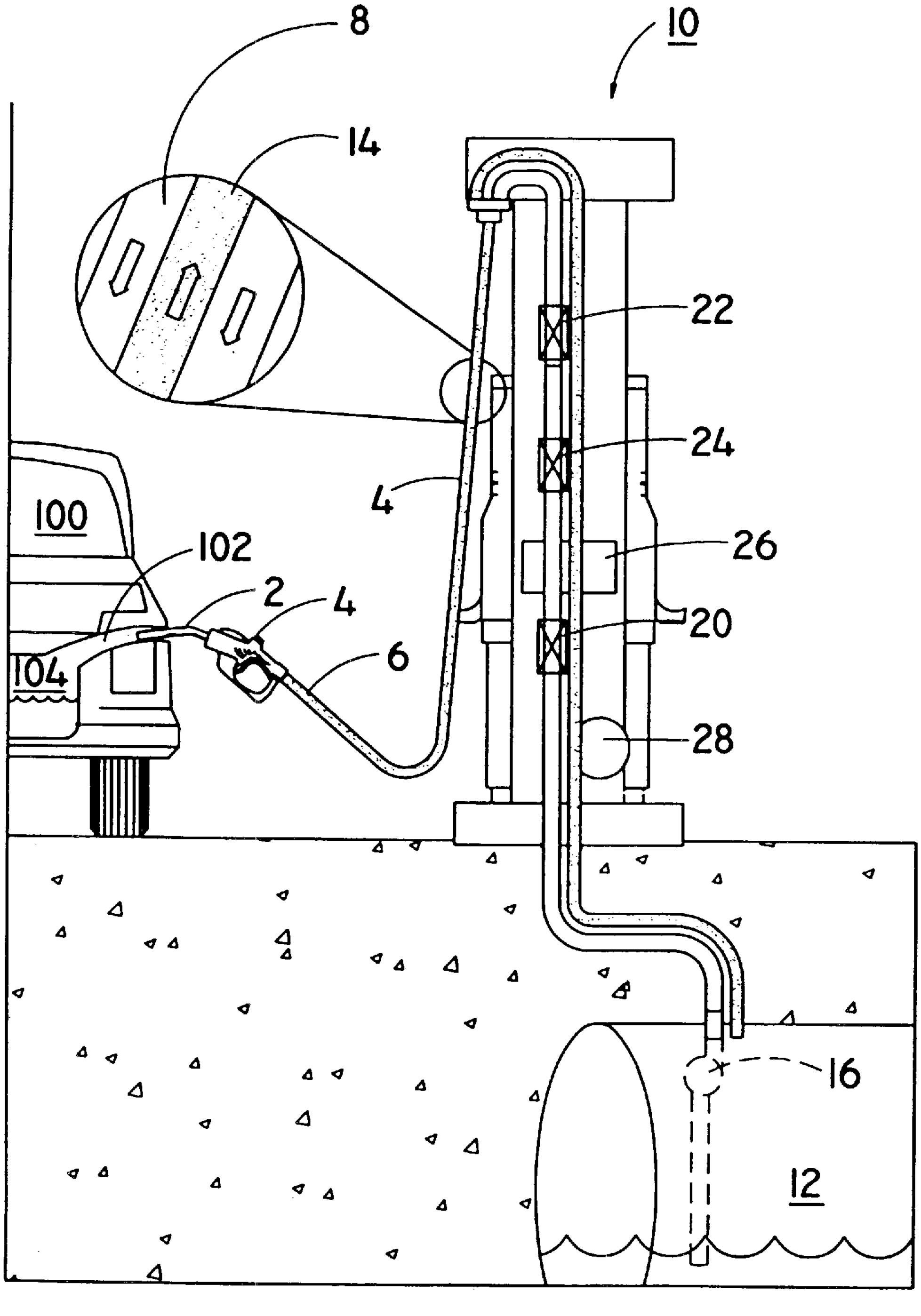
FIG. 1 is a schematic representation of a fuel dispenser and dispensing environment constructed according to a preferred embodiment of the present invention.

Referring now to the drawings in general and FIG. 1 in particular, it will be understood that the illustrations are for the purpose of describing a preferred embodiment of the invention and are not intended to limit the invention thereto. As best seen in FIG. 1, in a typical service station, an automobile 100 is shown being fueled from a gasoline dispenser 10. A spout 2 of nozzle 4 is shown inserted into a filler pipe 102 of a fuel tank 104 during the refueling of the automobile 100.

A fuel delivery hose 6 is connected at one end to the nozzle 4, and at its other end to the fuel dispenser 10. In the case of a vapor recovery-equipped fuel dispenser, as shown by the cutaway view of the interior of the fuel delivery hose 6, a fuel delivery passageway 8 is formed within the fuel delivery hose 6 for distributing gasoline pumped from an underground storage tank 12 to the nozzle 2. Gasoline is typically pumped by a delivery pump system 16 located within tank 12. The fuel delivery passageway 8 is typically annular within the delivery hose 6 and tubular from within the fluid dispenser 10 to the tank 12. The fuel delivery hose 6 typically includes a tubular vapor recovery passageway 14 for transferring fuel vapors expelled from the vehicle's fuel tank 104 to the underground storage tank 12 during the refueling of the vehicle 100.

A vapor recovery pump 28 provides a vacuum in the vapor recovery passageway 14 for removing fuel vapor during a refueling operation. The vapor recovery system using the pump 28 may be any suitable system such as those shown in U.S. Pat. Nos. 5,040,577 to Pope, 5,195,564 to Spalding, or 5,333,655 to Bergamini el al. In addition, the invention is useful on dispensers that are not vapor recovery dispensers.

The fuel delivery passageway 8 typically includes a control valve 22, a positive displacement flow meter 24 and fuel filter 20. The fuel dispenser 10 also includes a control system 26 operatively associated with the control valve 22, flow meter 24 and the fuel pump 16. Th e control system 26 includes memory 30 (see FIG. 2) for accessing and storing data and program information necessary for operation.

In the preferred embodiment, the flow meter 24 drives a pulser (not shown) that provides a volume signal 34, such meter/pulser devices have been used for years to show the volume of fuel dispensed, and more recently to determine a derived vapor recovery volume, as per the patents noted above. The volume signal 34 is typically a series of volumetric pulses, each of which is representative of a predetermined volume of fuel delivered over the delivery path to the vehicle.

Figure 2:
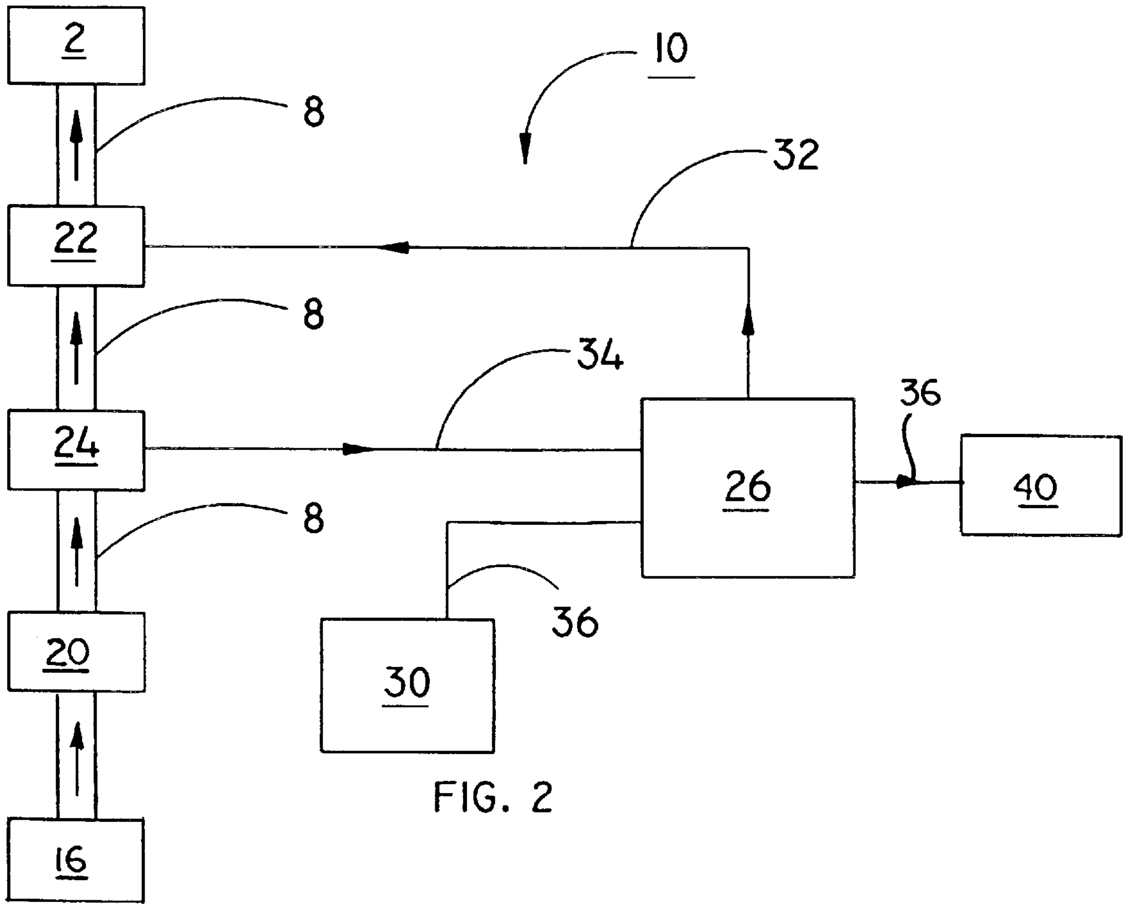
FIG. 2 is a schematic of a controller and fuel delivery path constructed according to the embodiment of FIG. 1.
Figure 3A:
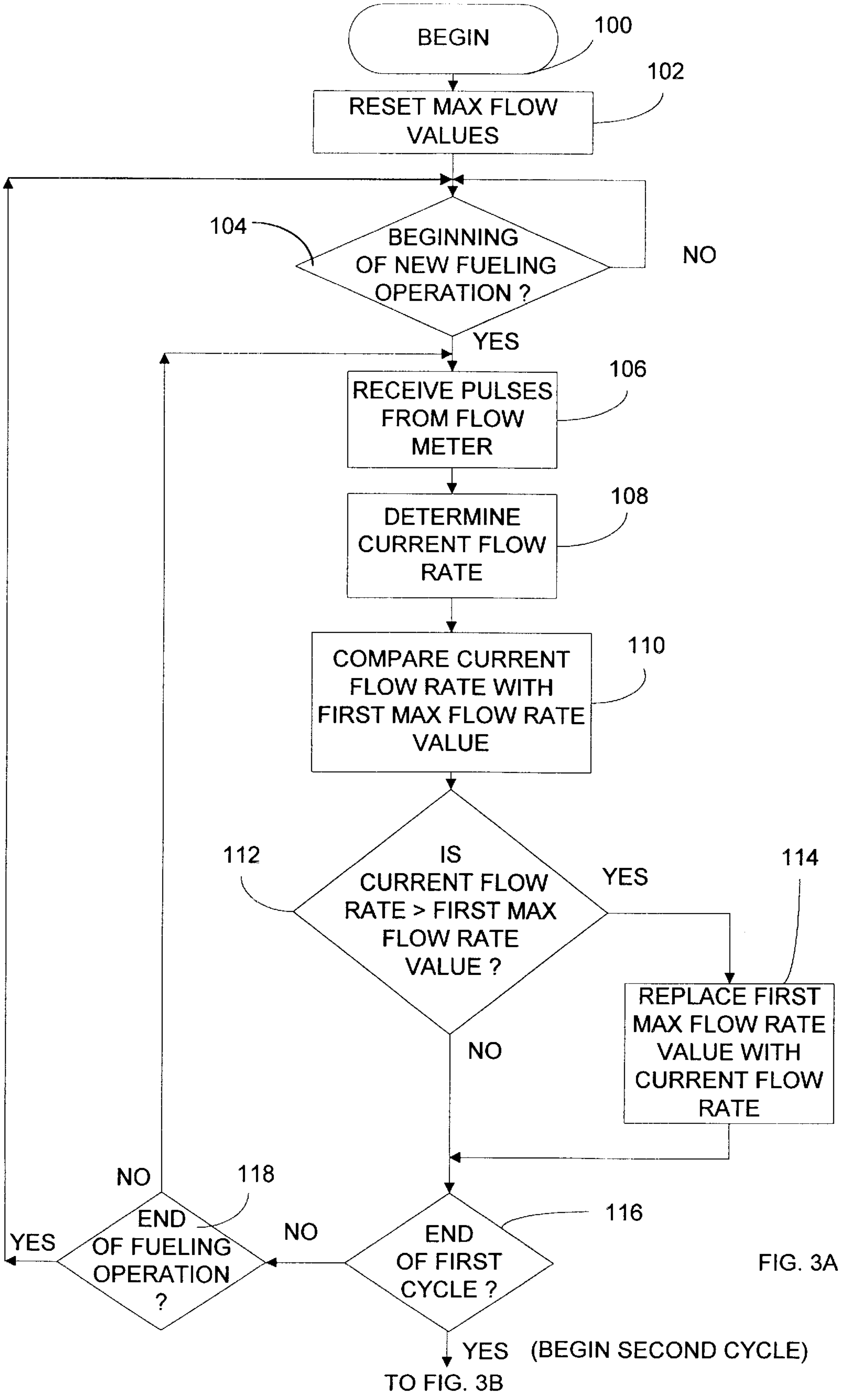
FIGS. 3A–3D depict a flow chart outlining the operation of the preferred embodiment of the current invention.
Figure 3B:
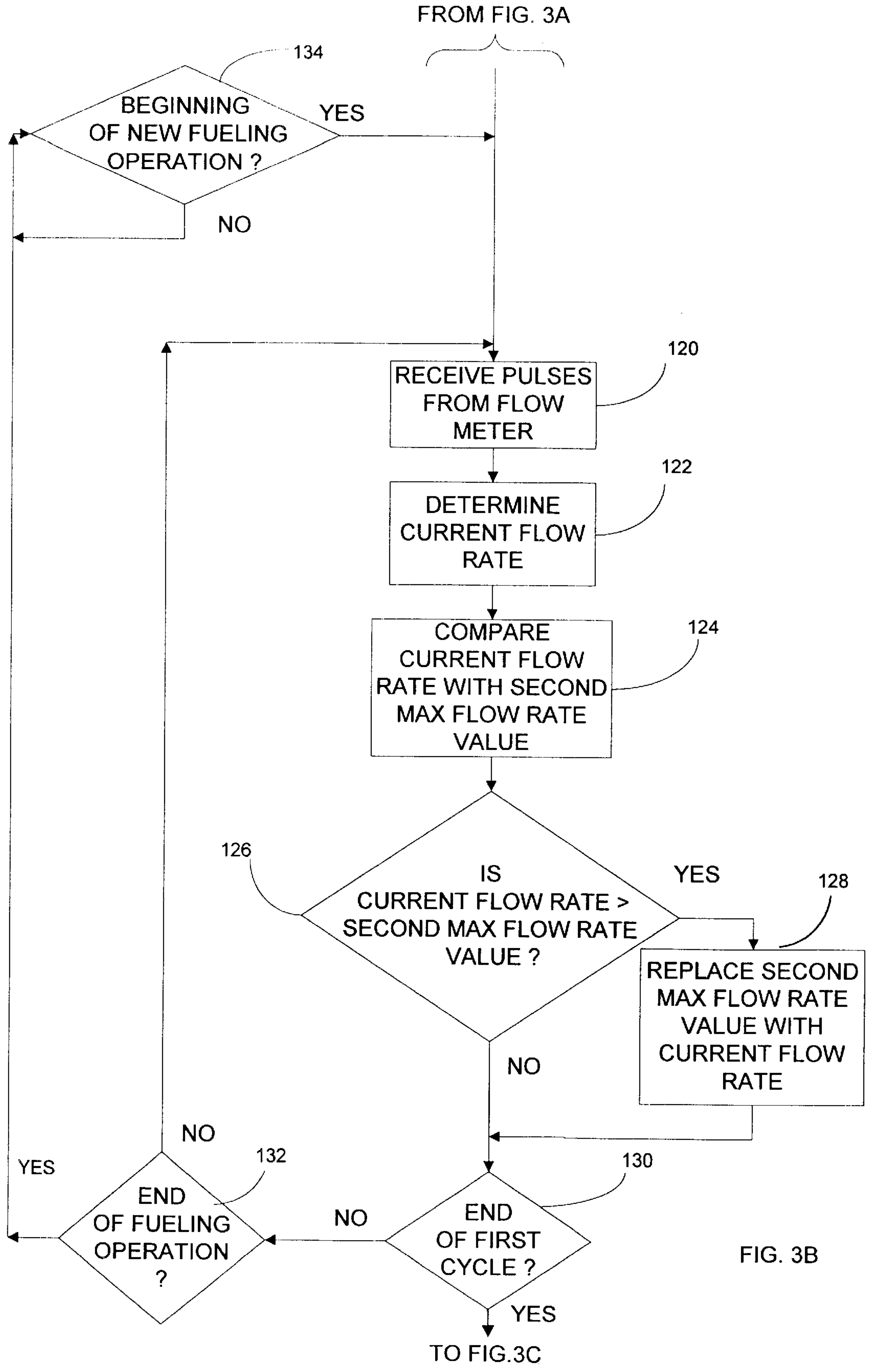
Figure 3C:
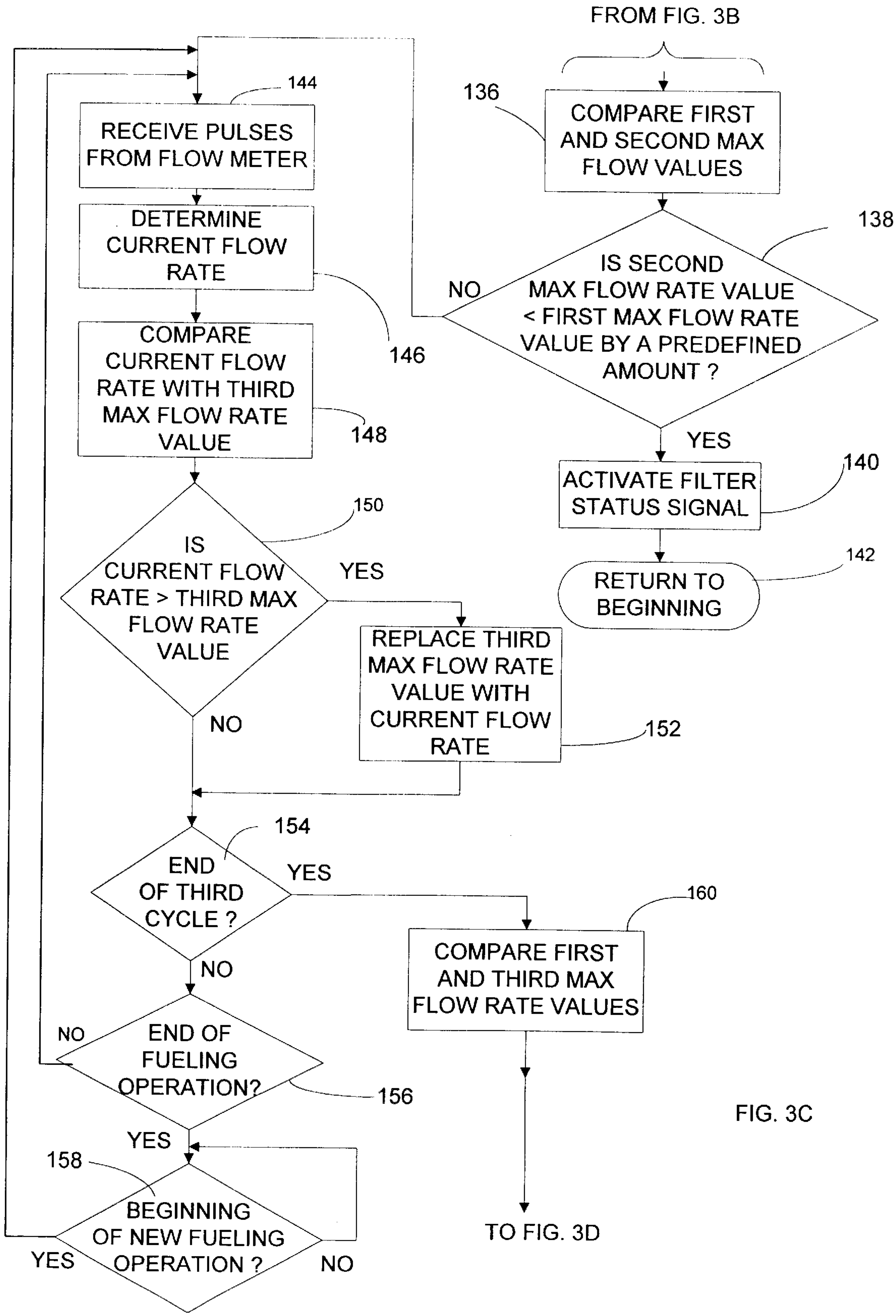
Figure 3D:
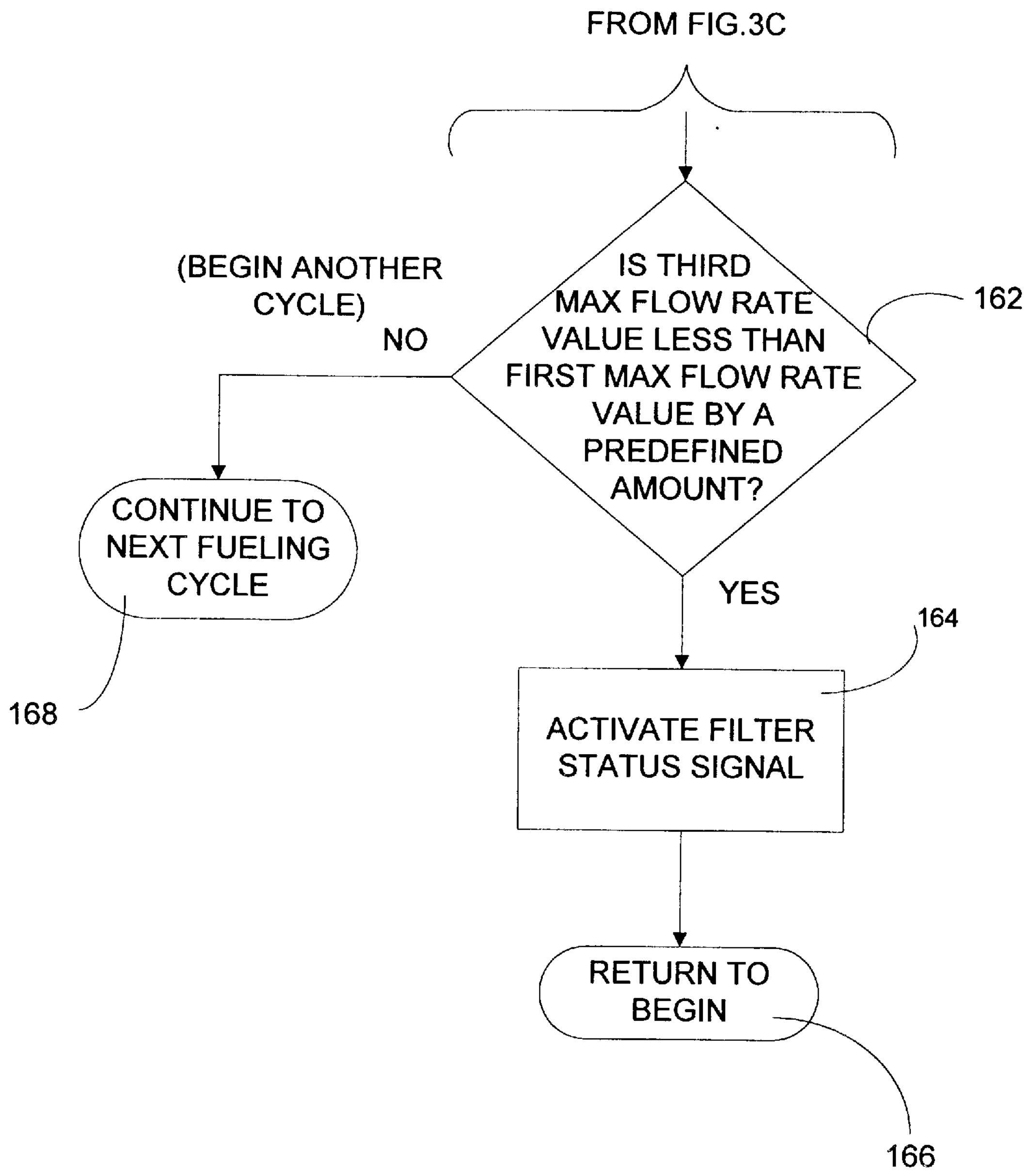

Turning now to FIG. 2, the preferred embodiment employs a fuel flow meter 24 which produces a fuel volume signal 34 by generating a digital transition for a given specific volume through the fuel flow meter 24. The output of the fuel flow meter 24 is fed to the control system 26. The control system 26 may count transitions in the fuel volume signal 34 over a fixed increment of time to yield a numerical value directly proportional to the flow rate of fuel through the fuel passageway 8. Preferably, the fixed time increment is 250 milliseconds (ms). Alternatively, the control system 26 measures the period of time between the transitions of the fuel volume signal 34 to yield a numerical value inversely proportional to a flow rate through the fuel passageway 8. With either method of determining flow rate, the control system 26 calculates flow rate throughout each fueling operation.

In operation, the control system 26 monitors fuel flow rate over a series of cycles. Each cycle generally includes a plurality of fueling operations and is typically defined by a predetermined amount of fuel being delivered. Preferably, the first cycle is defined as being ten thousand (10,000) gallons of product, while the second and any additional cycles are five thousand (5,000) gallons of product. The controller 26 stores the maximum flow rate recorded for each cycle and compares the maximum flow rates with subsequent cycles to determine when the maximum flow rate for the latter cycle drops from the first cycle by a predetermined amount from a first cycle thereby indicating an unclean filter. Maximum delivery rate drops between successive cycles may also be used to determine a filter is unclean.

Preferably, a drop in the flow rate of two gallons per minute or more will be used to indicate the filter is sufficiently unclean to require changing. If the drop between the first and second cycles is not greater than the predetermined amount indicative of an unclean filter, the controller monitors flow rates and records a maximum flow rate during a third cycle. The maximum flow rates for the first and third cycles are compared and if the third cycle maximum flow rate has dropped by the predetermined amount from the first cycle maximum flow rate, indicating an unclean filter, the control system recognizes that the filter is unclean and needs changing.

The control system 26 provides a filter status sensor signal 36 to an output device 40 once an unclean filter is detected. The output device 40 may be an audio and/or visual output device in the dispenser, at a central site controller or other remote location, among others. Whatever the embodiment, it is important that the filter status signal 36 alert the service station operator or other service provider that the filter 20 needs to be changed.

The flow chart of FIGS. 3A–3D outlines the operation of the preferred embodiment. The control system 26 begins (block 100) by initializing, and preferably resetting, values (block 102) stored in various memory locations which store values indicative of the maximum flow rate occurring during a respective cycle. The control system 26 initially awaits the beginning of a new fueling operation (block 104). When a new fueling operation begins, pulses arc received from the flow meter 24 (block 106) and the control system 26 determines the current flow rate (block 108). As noted, the flow rate may be determined by counting the number of pulses, which represent a known volume of fuel, occurring within a defined unit of time, preferably 250 ms. Alternatively, the period of time between volume pulses can be used as a measure of the inverse of the flow rate, permitting computation of the flow rate. The control system 26 next compares the current flow rate with a first maximum flow rate value stored in a first memory location in the memory 30 (block 110).

The control system 26 determines if the current flow rate is greater than the first maximum flow rate value stored in memory (block 112). If the current flow rate is greater than the maximum flow rate value, the stored maximum flow rate value is replaced with the current flow rate. Initially, the maximum flow rate values are reset to zero and the first measured current flow rate will usually be greater than the maximum flow rate value. If the current flow rate is not greater than the maximum flow rate value, the control system 26 determines if the first cycle has come to an end (block 116). The first cycle may be defined as a predefined number of gallons being delivered or a set amount of time.

If it is not the end of the first cycle, the control system 26 determines if the fueling operation is at an end (block 118). If the fueling operation is not at an end, the control system 26 continues to receive pulses from the flow meter (block 106), determine the current flow rate (block 108), compare the current flow rate with the maximum flow rate value stored in memory (block 110) and replace the first maximum flow rate value if the current flow rate value is greater than the maximum flow rate value (blocks 112 and 114). If the end of fueling operation has occurred, the control system awaits the beginning of a new fueling operation (block 104), wherein the process is repeated until the end of the first cycle (block 116). Notably, whether or not a cycle ends during a fueling operation is a matter of design choice.

Assuming that the first cycle ends during a fueling operation, the control system continues to receive pulses from the flow meter (block 120) and determine current flow rates (block 122). At this point, the control system is operating in a second cycle. Notably, the control system 26 compares the current flow rates with a second maximum flow rate value stored in a memory location in memory 30. The controller next determines if the current flow rate is greater than the second maximum flow rate value stored in memory (block 126). If the current flow rate is greater than the second maximum flow rate value, the second maximum flow rate value stored in memory is replaced with the current flow rate (block 128). If the current flow rate is less than the second maximum flow rate value, the control system does not replace the stored, maximum flow rate value.

Subsequently, the control system 26 determines if the second cycle has come to an end (block 130). If the second cycle is not an end, the control system 26 determines if the current fueling operation is at an end (block 132). If the operation is not at an end, the control system repeats the process for the second cycle by receiving pulses (block 120), determining current flow rates (block 122), comparing current flow rates with the second maximum flow rate value (block 124) and updating the maximum flow rate value accordingly (blocks 126 and 128) until the second cycle ends.

If fueling operation is at an end, but the second cycle is not, the control system 26 awaits the beginning of a new fueling operation (block 134) wherein the process of updating the maximum flow rate value is repeated until the end of the second cycle. At the end of the second cycle, the control system 26 compares the first and second maximum flow rate values (block 136) to determine if the second maximum flow rate value has decreased from the first maximum flow rate value by a predefined amount (block 138) indicative of a flow rate decrease associated with an unclean filter. If the maximum flow rate value for the second cycle is lower by the predefined amount, the control system 26 activates a filter status signal (block 140) to alert the appropriate machinery or personnel that the fuel filter needs replacing. Once the filter is replaced, the process returns to the beginning (block 100) wherein the maximum flow rate values for the first and second cycles are reset and the process begins anew.

If the maximum flow rate value for the second cycle has not decreased from the maximum flow rate value of the first cycle by the predefined amount, a third cycle begins (block 144) wherein the control system 26 continues to receive pulses from the flow meter 24. The control system 26, as done in the earlier cycles, determines current flow rates (block 146) and compares the current flow rates with a third maximum flow rate value (block 148). The control system 26 determines if the current flow rate is greater than the third maximum flow rate value (block 150) and replaces the third flow rate value with the current flow rate (block 152) as necessary. If the current flow rate is not greater than the third maximum flow rate value, the maximum flow rate value is not stored and memory is not changed.

The control system 26 next determines if the end of the third cycle has occurred (block 154). If it is not the end of the third cycle, the control system determines if it is the end of the current fueling operation (block 156). If it is the end of the fueling operation, the control system 26 awaits the beginning of a new fueling operation (block 158). If it is not the end of the fueling operation, the control system 26 continues to receive pulses from the meter (block 144), determine current flow rates 146, compare the current flow rates with the third maximum flow rate value (block 148) and update the latter as necessary (blocks 150 and 152).

At the end of the third cycle (block 154), the control system 26 compares the first and third maximum flow rate values stored in memory (block 160) and determines if the third maximum flow rate value is less than the first maximum flow rate value by more than the predefined amount indicative of an unclean filter (block 162). If the third maximum flow rate value is less than the first maximum flow rate value by the predefined amount, the control system 26 activates the filter status signal 36 to indicate that the filter 20 needs to be replaced. At this point, the control system 26 reverts back to the beginning (blocks 100 and 166) and resets the maximum flow rate values stored in memory and the process begins anew. If the third maximum flow rate value is not less than the first maximum flow rate value by the predefined amount, the process repeats itself for a fourth cycle (block 168). The control system 26 during the fourth cycle will determine and compare current flow rates with a fourth maximum flow rate value until the cycle ends wherein a comparison is made to see if the latest maximum flow rate value stored in memory is less than the first maximum flow rate by the predefined amount. The process will repeat itself until filter replacement is required.

Alternatively, the control system 26 may compare the maximum flow rate values during the cycles with a fixed minimum flow rate indicative of an unclean filter. Thus, instead of comparing maximum flow rates recorded during different cycles, the maximum flow rate for each cycle is compared with the minimum acceptable maximum flow rate value.

Certain modifications and improvements will occur to those skilled in the art upon reading of the foregoing description. It should be understood that all such modifications and improvements have been deleted herein for the sake of conciseness and readability but are properly in the scope of the following claims. For example, other flow rate maxima for the various cycles can be used, such as maximum averages or the like. Also, the notion of fixed "cycles" need not be used—the system may use any concept of later fuelings being capable of generating only slower fuelings than earlier fuelings. It is useful to consider a maximum rate during earlier and later periods (or cycles) to avoid any particular slow later fueling caused by, for example, a customer who chooses to fuel slowly, from giving a false reading of a clogged filter.

What is claimed is:

1. A fuel dispenser having filter status sensing comprising:

a fuel delivery path adapted for delivering fuel from a storage tank to a vehicle;

a fuel filter in said delivery path for filtering fuel flowing in said delivery path;

a flow monitor in the delivery path for measuring fuel flow in said delivery path; and a controller associated with said flow monitor adapted to determine and compare a first flow rate determined during a first cycle with a second flow rate determined during a subsequent cycle and provide a filter status signal when said first and second flow rates differ by more than a predetermined amount indicative of an unclean filter.

2. The fuel dispenser of claim 1 wherein said flow monitor is a flow meter adapted to provide a volumetric output signal representative of an amount of fuel flowing in said delivery path to said controller and said controller is adapted to calculate a flow rate based on the volumetric output signal divided by a unit of time.

3. The fuel dispenser of claim 2 wherein said volumetric output signal comprises pulses, each of which is representative of a predefined volume of fuel.

4. The fuel dispenser of claim 3 wherein said controller determines the flow rate by monitoring a number of the pulses occurring over a predefined time interval.

5. The fuel dispenser of claim 1 wherein said flow monitor is a flow meter adapted to provide a volumetric output signal representative of an amount of fuel flowing in said delivery path to said controller is adapted to calculate a flow rate based on an amount of time between occurrences of the volumetric output signal.

6. The fuel dispenser of claim 5 wherein said volumetric output signal comprises a series of pulses each of which is representative of a predefined amount of fuel.

7. The fuel dispenser of claim 1 wherein said predetermined amount is a value indicative of a reduction in fuel flow likely caused by said filter being unclean.

8. The fuel dispenser of claim 1 wherein said first flow rate is a maximum flow rate occurring during said first cycle and said second flow rate is a maximum flow rate occurring during said second cycle.

9. The fuel dispenser of claim 8 wherein each of said first and second cycles includes a plurality of fueling operations.

10. The fuel dispenser of claim 8 wherein said controller is associated with first and second memory locations and is adapted to store said first and second flow rates during each said cycle in respective of said memory locations and update said flow rates when a new maximum flow rate occurs during each said cycle.

11. The fuel dispenser of claim 1 wherein said filter status signal is sent to a display which provides an indicia that said filter is unclean.

12. The fuel dispenser of claim 1 wherein said filter status signal is sent to a central station controller.

13. The fuel dispenser of claim 1 wherein said filter status signal is sent to a remote monitoring location.

14. The fuel dispenser of claim 1 wherein each said cycle includes a plurality of fueling operations.

15. A fuel dispenser having filter status sensing comprising:

a fuel delivery path adapted for delivering fuel from a storage tank to a vehicle;

a fuel filter in said delivery path for filtering fuel flowing in said delivery path;

a flow meter in the delivery path for providing volumetric pulses representative of an amount of fuel flowing in said delivery path; and a controller associated with said flow meter and first and second memory locations; said controller adapted to:

receive the volumetric pulses and calculate actual flow rates by monitoring a number of the volumetric pulses occurring over a predetermined time interval;

store a first maximum flow rate based on the actual flow rates monitored during a first cycle in said first memory location and update said first maximum flow rate when a flow rate higher than the first maximum flow rate stored in said first memory location occurs during said first cycle;

store a second maximum flow rate based on the actual flow rates monitored during a second cycle in said second memory location and update said second maximum flow rate when a flow rate higher than the second maximum flow rate stored in said second memory location occurs during said second cycle;

compare said first maximum flow rate with said second maximum flow rate; and provide a filter status signal when said first and second flow rates differ by more than a predetermined amount.

16. The fuel dispenser of claim 15 wherein said predefined time interval is about 250 milliseconds.

17. The fuel dispenser of claim 15 wherein each said cycle extends over a plurality of individual fueling operations.

18. The fuel dispenser of claim 15 wherein each said cycle is defined by a predetermined quantity of fuel to be delivered.

19. The fuel dispenser of claim 18 wherein said predetermined quantity of fuel for said first cycle is ten thousand (10,000) gallons.

20. The fuel dispenser of claim 19 wherein said predetermined quantity of fuel for said second cycle is five thousand (5,000) gallons.

21. The fuel dispenser of claim 18 wherein said predetermined quantity of fuel is programmable.

22. The fuel dispenser of claim 15 wherein each said cycle is defined by a predetermined amount of time.

23. The fuel dispenser of claim 22 wherein said predetermined amount of time is programmable.

24. The fuel dispenser of claim 15 wherein said predetermined amount is approximately two (2) gallons.

25. The fuel dispenser of claim 15 wherein when said first and second flow rates do not differ by more than the predetermined difference after said first and second cycles, said controller is further adapted to:

store a third maximum flow rate during a third cycle and update said maximum flow rate when a flow rate higher than the stored maximum flow rate occurs during said second cycle;

compare said first maximum flow rate with said third maximum flow rate; and provide a filter status signal when said first and third flow rates differ by more than a predetermined amount.

26. The fuel dispenser of claim 15 wherein each said cycle is defined by a predetermined number of transactions.

27. A fuel dispenser computer for use in a fuel dispenser having a fuel delivery path, a filter along the delivery path and a flow monitor providing a flow signal representative of a quantity of fuel flow to the computer, said computer comprising a controller and memory associated with said controller adapted to:

receive the flow signal representative of a quantity of fuel flow during a plurality of fueling operations;

determine current flow rates based on the quantity of fuel flow per unit of time;

compare the current flow rates with a first maximum flow rate value stored in a first memory location during a first cycle;

store the current flow rate in said first memory location if the current flow rate is greater than the first maximum flow rate value stored in said first memory location during the first cycle;

compare the current flow rate value with a second maximum flow rate value stored in a second memory location during a second cycle;

store the current flow rate in said second memory location if the current flow rate is greater than the second maximum flow rate value stored in said second memory location during the second cycle;

compare the first maximum flow rate value and the second maximum flow rate value after the first and second cycles; and provide a filter status signal if the first and second maximum flow rate values differ by more than a predetermined difference.

28. The fuel dispenser computer of claim 27 wherein the cycles are defined by delivery of a predefined amount of fuel.

29. The fuel dispenser computer of claim 28 wherein said predefined amount of fuel for the first cycle is about ten thousand (10,000) gallons.

30. The fuel dispenser computer of claim 28 wherein said predefined amount of fuel for the second cycle is about five thousand (5,000) gallons.

31. The fuel dispenser computer of claim 27 wherein each said cycle is defined by a predetermined amount of time.

32. The fuel dispenser computer of claim 27 wherein the maximum flow rate values are initially set to zero.

33. The fuel dispenser computer of claim 27 wherein the unit of time for determining the current flow rate is about two-hundred and fifty (250) milliseconds.

34. The fuel dispenser computer of claim 27 wherein the predetermined difference is about 2 gallons per minute.

35. The fuel dispenser computer of claim 27 wherein when the maximum flow rate values for the first and second cycles do not differ by more than the predetermined difference said controller is further adapted to:

compare the current flow rate with a third maximum flow rate value stored in a third memory location during a third cycle;

store the current flow rate in said third memory location if the current flow rate is greater than the third maximum flow rate value stored in said third memory location during the third cycle;

compare the first maximum flow rate value and the third maximum flow rate value after the third cycle; and provide a filter status signal if the first and third maximum flow rate values differ by more than the predetermined difference.

36. The fuel dispenser computer of claim 35 wherein one memory location serves as the second memory location during the second cycle and as the third memory location during the third cycle.

37. The fuel dispenser computer of claim 27 wherein said flow signal is a series of pulses representative of a predefined amount of fuel.

38. The fuel dispenser of claim 27 wherein each said cycle is defined by a predetermined number of transactions.

39. A method for providing a filter status signal associated with a fuel dispenser having a fuel delivery path, a filter along the delivery path and a flow monitor providing a flow signal representative of a quantity of fuel flow to the computer, said method comprising:

generating a flow signal representative of a quantity of fuel flow during a plurality of fueling operations;

determining current flow rates based on the quantity of fuel flow per unit of time;

comparing the current flow rate with a first maximum flow rate value stored in a first memory location during a first cycle;

storing the current flow rate in the first memory location if the current flow rate is greater than the first maximum flow rate value stored in said first memory location during the first cycle;

comparing the current flow rate with a second maximum flow rate value stored in a second memory location during a second cycle;

storing the current flow rate in the second memory location if the current flow rate is greater than the second maximum flow rate value stored in the second memory location during the second cycle;

comparing the first maximum flow rate value and the second maximum flow rate value after the first and second cycles; and providing a filter status signal when the first and second maximum flow rate values differ by more than a predetermined difference.

40. The fuel dispenser of claim 39 wherein when the maximum flow rate values for the first and second cycles do not differ by more than the predetermined difference, the method further comprises the steps of:

comparing the current flow rate with a third maximum flow rate value stored in a third memory location during a third cycle;

storing the current flow rate in the third memory location if the current flow rate is greater than the third maximum flow rate value stored in the third memory location during the third cycle;

comparing the first maximum flow rate value and the third maximum flow rate value after the third cycle; and providing a filter status signal if the first and third maximum flow rate values differ by more than the predetermined difference.

41. The fuel dispenser of claim 39 wherein each of the cycles are defined by a predefined quantity of fuel being delivered.

42. The fuel dispenser of claim 41 wherein the first cycle is defined by ten thousand (10,000) gallons of fuel being delivered.

43. The fuel dispenser of claim 41 wherein the second cycle is defined by five thousand (5,000) gallons of fuel being delivered.

44. The fuel dispenser of claim 39 wherein each of the cycles is defined by a predefined amount of time.

45. The fuel dispenser of claim 39 wherein the flow signal is series of volumetric pulses and the step of continuously receiving the flow signal includes reading the volumetric pulses.

46. The fuel dispenser of claim 39 wherein each said cycle is defined by a predetermined number of transactions.

47. A fuel dispenser filter status system comprising:

a fuel delivery path adapted for delivering fuel from a storage tank to a vehicle;

a fuel filter in said delivery path for filtering fuel flowing in said delivery path;

a flow monitor in said delivery path for measuring fuel flow in said delivery path; and a controller associated with said flow monitor adapted to determine and compare a first flow rate taken during a first cycle with a predefined flow rate and provide a filter status signal when said first and predefined flow rates differ by more than a predetermined difference.

48. A filter status system for providing a filter status signal when a fuel filter in a fuel delivery path is unclean comprising:

a fuel dispenser having a fuel delivery path adapted for delivering fuel to a vehicle a filter in the fuel delivery path for filtering liquid flowing in said delivery path;

a flow monitor in the fuel delivery path for measuring flow in said delivery path; and a fuel dispenser controller associated with said flow monitor adapted to determine and compare a first flow rate taken during a first cycle with a predefined flow rate and provide a filter status signal when said first and predefined flow rates differ by more than a predetermined difference.

49. A method for providing a filter status signal comprising:

determining current flow rates based on a quantity of fuel flow per unit of time;

comparing the current flow rate with a first maximum flow rate value occurring during a first cycle;

storing the current flow rate if the current flow rate is greater than the first maximum flow rate value occurring during the first cycle;

comparing the current flow rate with a second maximum flow rate value occurring during a second cycle;

storing the current flow rate if the current flow rate is greater than the second maximum flow rate value occurring during the second cycle;

comparing the first maximum flow rate value and the second maximum flow rate value after the first and second cycles; and providing a filter status signal when the first and second maximum flow rate values differ by more than a predetermined difference.

* * * * *